Dec. 13, 1938. D. LA FERNEY 2,140,428
MACHINE FOR CRACKING NUTS
Filed Sept. 25, 1934 5 Sheets-Sheet 2

Inventor;
Delbert La Ferney
Vernon E. Hodges
By his Atty.

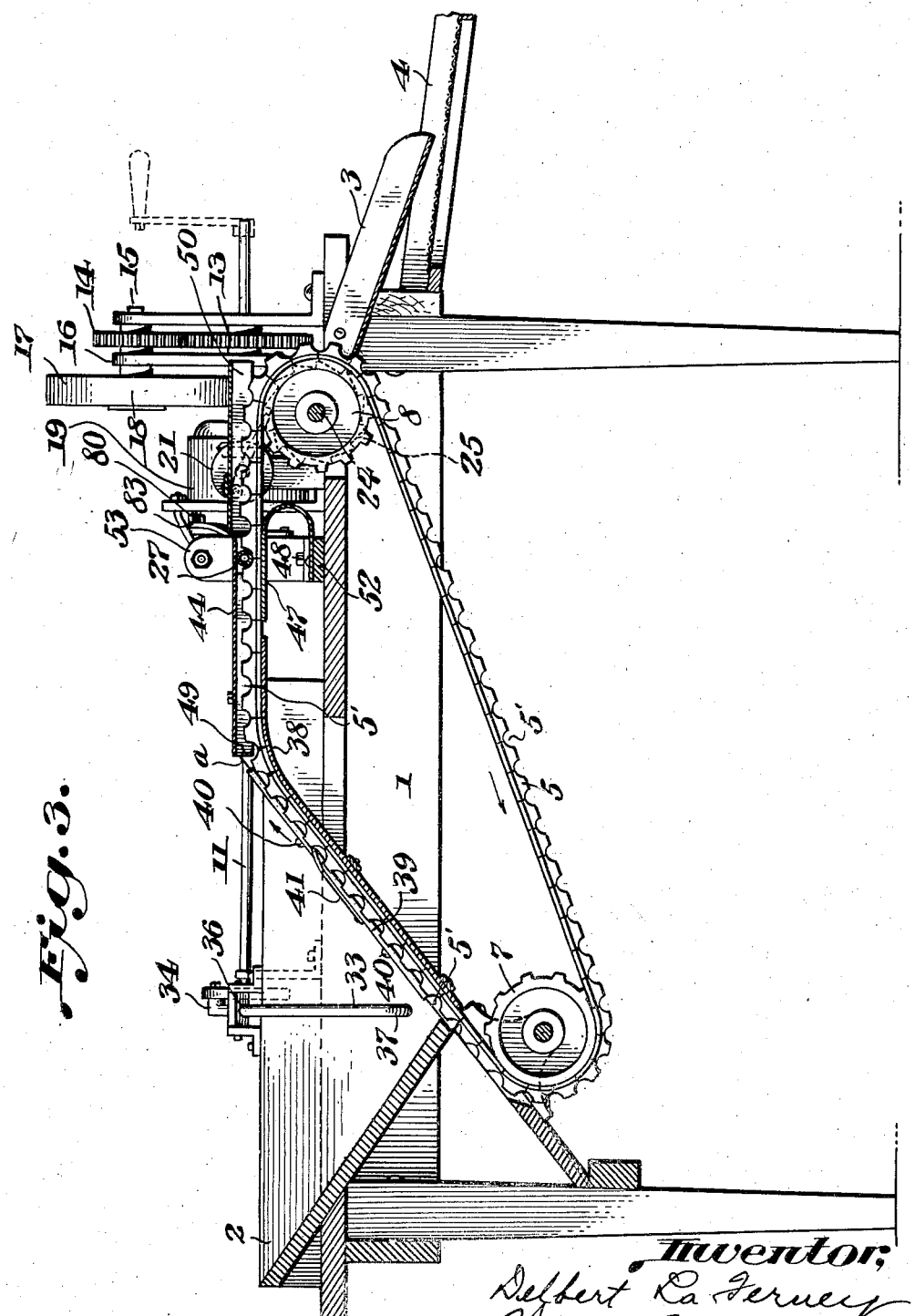

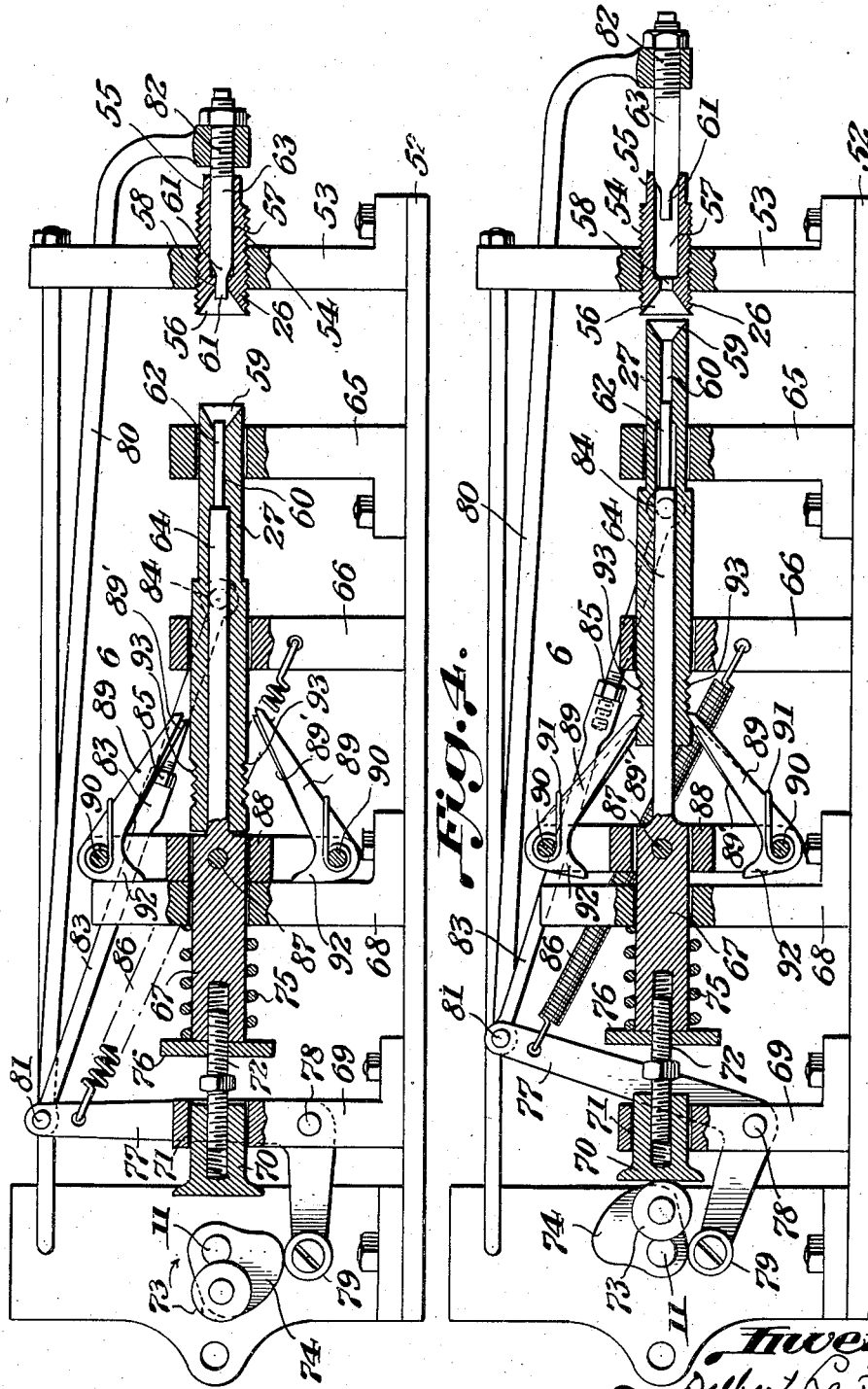

Dec. 13, 1938. D. LA FERNEY 2,140,428
MACHINE FOR CRACKING NUTS
Filed Sept. 25, 1934 5 Sheets-Sheet 5
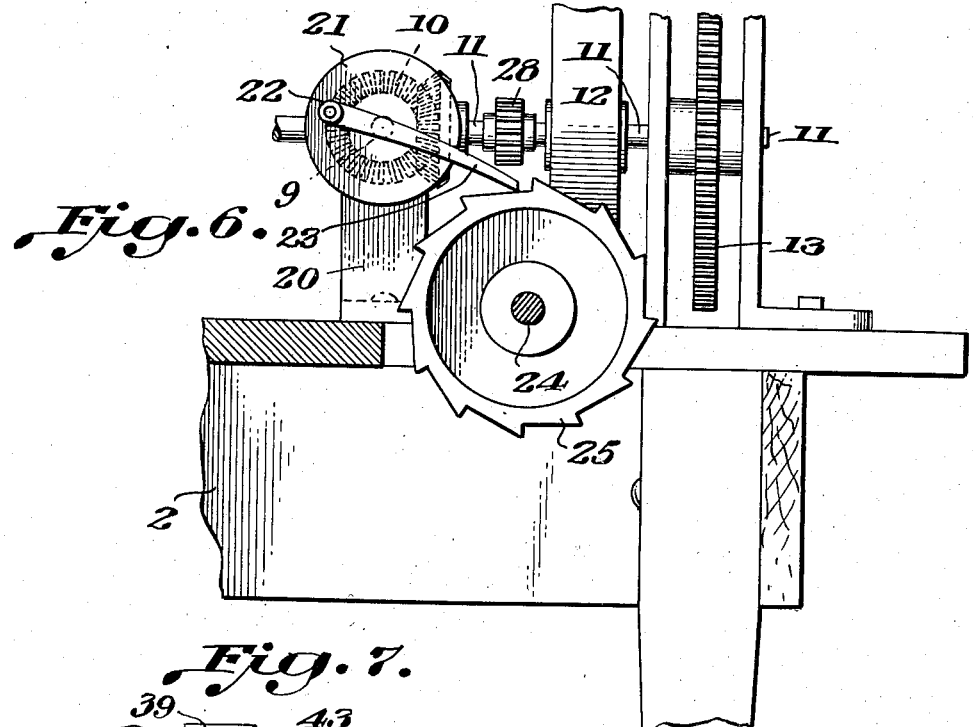
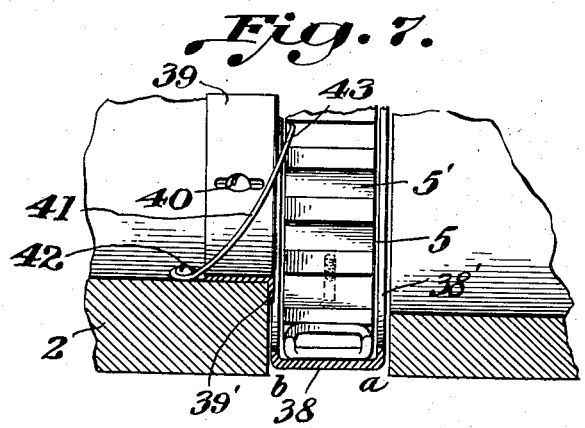
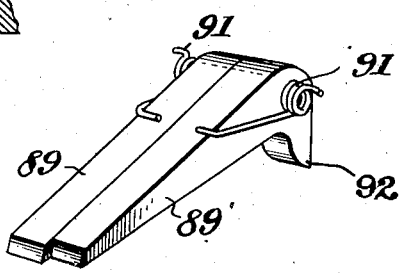
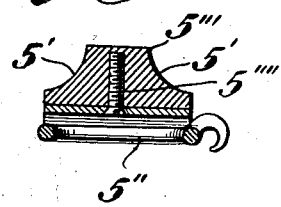

Patented Dec. 13, 1938

2,140,428

UNITED STATES PATENT OFFICE 2,140,428

MACHINE FOR CRACKING NUTS

Delbert La Ferney, Pine Bluff, Ark.

Application September 25, 1934, Serial No. 745,459

5 Claims. (Cl. 146—12)

This invention relates to an improved machine for cracking nuts particularly pecans.

Pecans are one of the most difficult nuts to crack by machine operation if it is desired to obtain the meats in a whole or undamaged condition.

It is the object of my invention to provide an improved automatic machine for successfully cracking nuts, particularly pecans, whether of the hard or soft shell variety and regardless of the varying lengths and shapes of the ends thereof in such manner that the meats will be whole and undamaged, thus securing a product which will command the best market price.

Prior machines for cracking pecans, of which I have knowledge, have failed in one or more of the following particulars: to properly deliver the nuts to the cracking means in such a reliable and accurate fashion and position as to avoid tilting or dis-lodgment of the nut from the feeder or its escape from the cracking means without undergoing the cracking operation; to insure cracking the shells without mashing, crushing, or damaging the meats, or, to carry on the cracking operation with such regularity and rapidity as to constitute an economical and profitable operation, or to prevent clogging and imperfect or irregular operation of the machine.

The general object of my improved nut cracking machine is to provide means which will overcome the foregoing defects which have prevailed in prior machines of which I have knowledge and to provide improvements which insure reliability, speed, and accuracy in the feed of the nuts to the cracking means; prevent clogging of the nuts in the hopper; obviate the presentation of more than one nut at a time to the cracking means; prevent the nuts from jarring or jumping out of the conveyor which conducts them from the hopper to the cracking means; insure the proper delivery of the cracked nuts from the cracking means and the maintenance of the meats in their whole condition for subsequent separation from their cracked shells and internal unpalatable matter; to accurately center the nuts in relation to the anvil and the cracking plunger and back up the coned or rounded ends of the pecans regardless of the length of the nuts or the shape of said ends so as to insure that the cracks in the shell of the nut occur in the "belt" of the nut instead of in the rounded or coned ends and thus enable the pecan to be so cracked that no mashing or crushing of the meats in the ends of the nut will take place, which result has not heretofore been accomplished, so far as I am aware; crack the nut with adequate pressure delivered in the direction of the longitudinal axis of the pecan but at the same time exert the cracking pressure only through a very small distance, say one sixteenth of an inch, thereby bringing about the cracking in the belt and insuring against any cracking or fracture of the meat; provide clearing or ejecting or dis-lodging means which, while not interfering with the pecan, no matter what its shape or length, will effectually dislodge the cracked nut from the anvil and the plunger after cracking has been effected, enabling the cracked nut to be conveyed away for subsequent hand separation of its shell and unpalatable interior from its meat; facilitate the separation of the cracked nut from the means which feeds it to the cracking plunger and anvil and carries it away from them after it has been cracked; to provide improved operating means for the cracking plunger and the ejectors or dislodging devices for the cracked nuts; to provide improved operating and timing means whereby the conveyor will accurately and reliably deliver the uncracked nuts to the cracking means in proper co-ordination therewith and deliver the cracked nuts therefrom without possibility of mis-alinement; and to provide other improved instrumentalities, mechanisms, and improved combinations insuring, as near as may be, the economical, rapid, and perfect cracking of nuts, particularly pecans, to the end that all sizes and shapes of pecans may be so cracked that their meats will be whole and unmarred, thus insuring the highest class of product in a machine of this character.

The foregoing objects, and others, which will appear hereinafter, are accomplished by the provision of a machine embodying the principles and the constructions hereinafter fully described and shown in the accompanying drawings, in which:

Fig. 3 is a longitudinal section on the line 3—3, Fig. 1;

Fig. 4 is a detail longitudinal section on the line 4—4, Fig. 1, the plunger being shown in retracted position, illustrating the manner in which the ejectors operate;

Fig. 5 is a similar view, illustrating the action of the cracking plunger and the anvil;

Fig. 6 is a detail section on the line 6—6, Fig. 1;

Fig. 7 is a detail section on the line 7—7, Fig. 1;

Fig. 8 is a detail cross section through one of the sections of the endless nut conveyor;

Fig. 9 is a detail perspective view of one pair of the triggers or locking pawls.

The machine may be supported by its own framework, or mounted on a suitable bench or table 1.

A hopper 2, having an inclined bottom, is intended to receive the nuts which are to be cracked by the machine.

A chute 3 receives the cracked nuts and delivers them to a screen 4 through which the small parts of the hulls or shells and the unpalatable insides of the nuts may drop.

Figure 1:
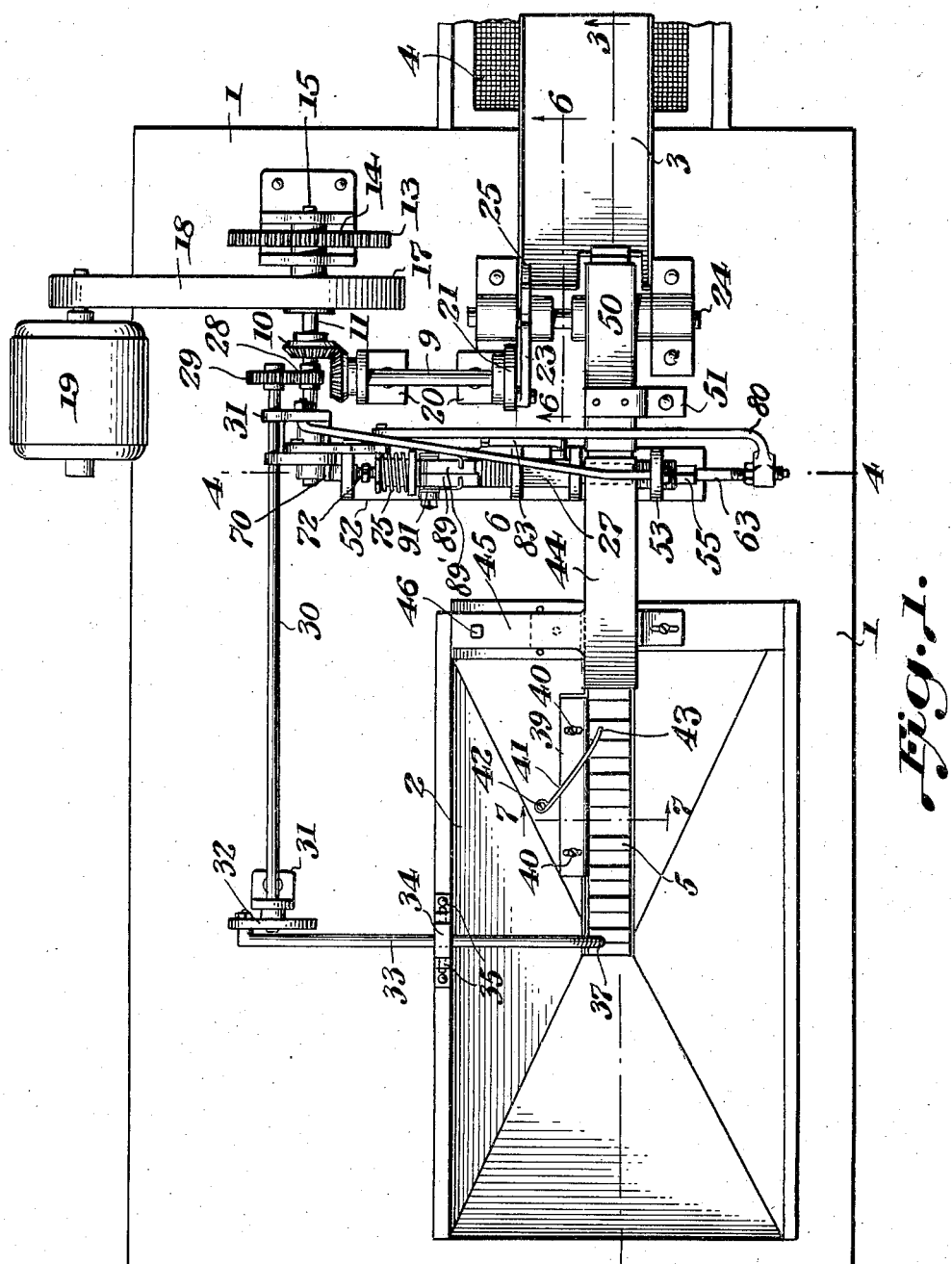
Figure 1 is a plan view.
Figure 2:
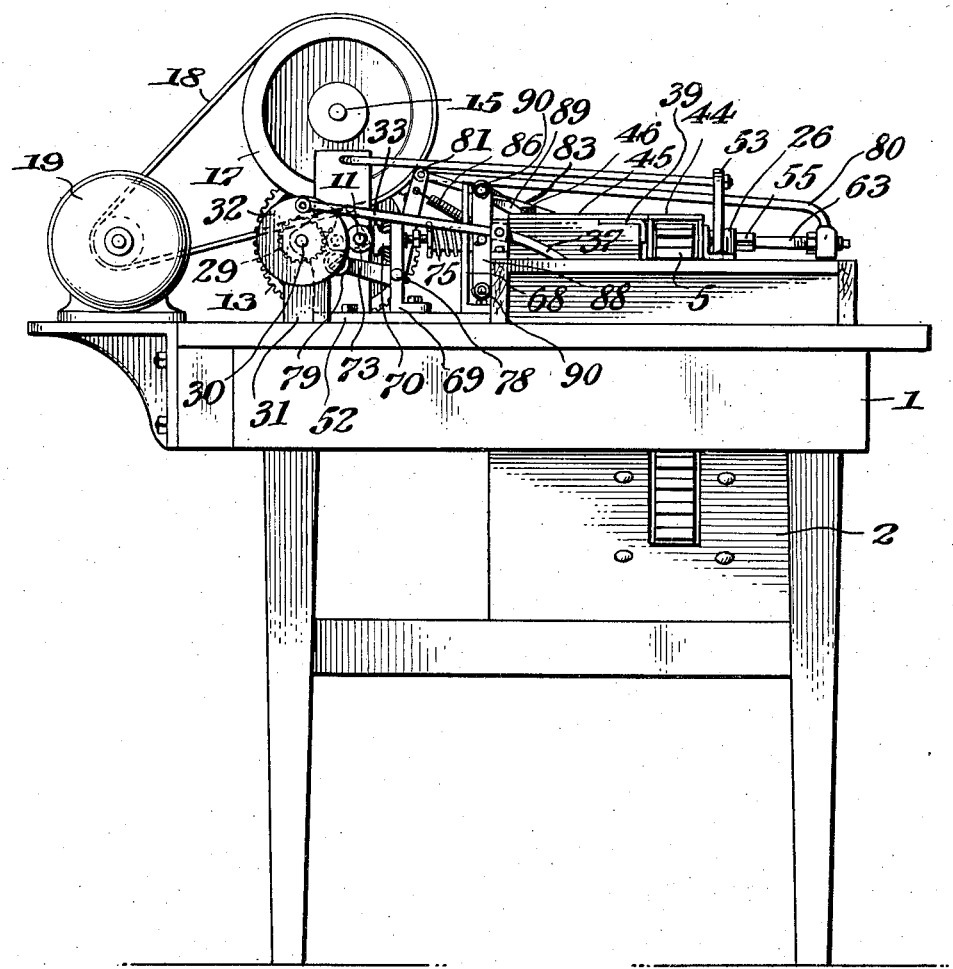
Fig. 2 is a front elevation.

An endless conveyor 5 conduits uncracked nuts from the hopper 2 to the cracking means which is shown, generally, at 6, Fig. 1, and in detail in Figs. 4 and 5.

The endless nut conveyor 5 travels around an idler sprocket 7 and a driving sprocket 8, the latter being driven by a jack-shaft 9 which, in turn, is rotated by bevel gears 10, one of which is carried by a shaft 11. The shaft 11, which is mounted in suitable bearings 12, carries a large gear 13 which is driven by a gear pinion 14 on a shaft 15, mounted in suitable bearings 16 and carrying a belt pulley 17, which is connected by a belt 18 to an electric motor 19.

The motor 19 serves as the power to operate the entire machine.

The jack-shaft 9, which is mounted in bearings 20, carries a wrist wheel 21, to which is pivoted on a wrist pin 22, an operating pawl 23.

The shaft 24, which carries the driving sprocket wheel 8, also carries a ratchet wheel 25 with which the free end of the pawl 23 is adapted to engage. The interdental spaces between the teeth of the ratchet wheel 25 are of such length that the timing of the step-by-step or intermittent travel of the nut conveyor 5, occurs in such manner that one of the pockets 5' of the conveyor 5 is always accurately alined with the anvil 26, Figs. 4 and 5, and the cracking or crushing plunger 27 of the cracking means. This is determined by proper proportioning of the spaces in relation to the throw and dwell or dead center positions of the pawl 23, for it will be understood that the shaft 9 is continuously rotated and that the travel of the pawl 23 will vary according to the dead center position of the pawl and its positions at other times during the rotation of the wrist wheel 21.

The shaft 11 carries a pinion 28 which, through a pinion 29, drives a shaft 30, mounted in bearings 31, Fig. 1. The shaft 30 carries a wrist wheel 32 which operates a nut agitator or stirrer 33, operating in the hopper 2. The nut agitator or stirrer 33 is rockably mounted by a rockable block 34 mounted in bearings 35 on the edge of the hopper 2 and said stirrer 33 slides through a hole 36 in said block 34. The lower and inner end of the stirrer is downwardly turned as at 37. The continued turning of the shaft 30 by the shaft 11 and the gears 28, 29 causes the stirrer 33 to be projected downwardly into the bed of nuts contained in the hopper 2 and to stir them up but in addition to this, the hooked end 37 is so arranged that it will tend to draw a single nut into the pocket 5' at the lowest part of the hopper, as indicated in Fig. 3. This action prevents clogging and insures the feeding of the nuts to the pockets 5' of the conveyor 5 as they successively move upwardly into the bottom of the hopper after passing around the idler sprocket 7.

The conveyor 5 operates in a metal trough 38, Fig. 7, the side walls 38' of the trough being sufficiently high to prevent lateral displacement of the conveyor 5 but, at the same time, these walls 38' do not rise as high as the inclined bottom of the hopper and hence do not interfere with the access of the nuts to the pockets 5'.

The trough 38 serves as a guide for the conveyor 5 to insure its travel in proper alinement. To insure the retention of the nuts in the pockets 5', the conveyor 5 is caused to travel in a slightly canted position, due to the fact that the bottom of the trough 38 is slanted slightly. Referring to Fig. 7, the right hand side $a$ of the trough 38 is about one sixteenth of an inch higher than the left hand side $b$, which position cants the conveyor 5 and hence insures that the nuts will tend to work toward the $b$ side and will not pass out of the pockets 5', due to the travel of the conveyor and the vibration of the machine.

On the $b$ side of the conveyor, there is an abutment flange or guide plate 39 which may be adjusted laterally or in general transverse relationship to the conveyor 5 to a limited extent, by the provision of slot and bolt connections 40. The flange 39 is connected to the bottom of the hopper 2 and has an angular lip or part 39', which serves as an abutment or apron against which the ends of the nuts abut and along which they travel. The adjustment provided at 40 may be three eighths of an inch, more or less, but it is sufficient to prevent two pecans entering the same pocket 5' at the same time, if relatively short pecans are being handled by the machine. On the other hand, the adjustment 40 enables a setting of the flange 39 to be effected sufficiently to enable relatively long pecans to be accommodated in the pockets 5' if long pecans are being handled by the machine.

To prevent the pecans from up-ending, a suitable wire or leaf spring 41 is fastened to the hopper bottom at 42 and has its free end 43 overlying the $b$ side of the conveyor. As the nuts pass under the free end 43, they are pushed down into the pockets 5' if they have previously up-ended or tilted.

The conveyor 5 is composed of links 5'' and blocks 5''' which surround the links 5'' and are connected thereto by screws 5'''', as shown in Fig. 8. The pockets 5' are formed by complementary parts or halves or adjacent blocks. In view of this construction, after the nut has been cracked and is carried along to where the conveyor turns downwardly while passing around the sprocket wheel 8, the adjacent blocks break contact, which facilitates the discharge of the cracked nut therefrom and prevents sticking and clogging, the nut passing freely onto the chute 3.

Covering the upper part of the conveyor 5, is a top 44 which is of springy metal, and extends over the point where the cracking of the nut is effected by the anvil 26 and the plunger 27. This top 44 is carried by an arm 45 which is secured at 46 to the hopper, said arm 45 being springy or flexible like the top 44. The top 44 is free to rise and fall while holding the nuts in their pockets 5', as they travel to the nut cracking means shown in Figs. 4 and 5.

A spring 47, which is secured at 48, has its free horizontal part serving as a bottom or a continuation of the trough 38, the purpose of this spring bottom being to hold the conveyor containing the nuts in a raised position as the nuts arrive in position to be cracked. The spring also accommodates the lateral expansion of the nut, due to the cracking operation.

The section construction of the blocks of the conveyor 5 also permits the expansion of the nut undergoing cracking to be compensated for because these blocks can spread during the cracking operation.

Underlying or beneath the top 44 are side walls 49 which are not connected to the top 44 but which hold the nuts against endwise pressure as they travel to the position where they are cracked by the anvil 26 and plunger 27.

While the top 44 extends over the nut when the latter is in position to be cracked, of course, the side walls 49 do not extend to that position because they would be in the way of the operation of plunger 27.

Overlying the conveyor 5 just beyond the nut cracking position and also extending above the driving sprocket 8, is an inverted trough-shaped retainer 50, which holds the cracked nuts in the sprockets 5' and insures their delivery by the conveyor to the chute 3. This retainer 50 may be of springy metal and is carried by a flexible or springy arm 51, the purpose being to slightly yield if the nuts contact therewith.

Preferably, one side of the bottom of the hopper 2 will be higher than the other side, which flanks the trough 38, as shown in Fig. 7, the purpose being to permit a nut of any length to enter a pocket 5' and yet not to jar out of the pocket. In that connection, the slant of the bottom of the trough 38 from the high side $a$ to the low side $b$, causes the nut, whatever its length, to move toward the high side, which high side is overlapped by the lip 39' of the flange 39, previously described.

Reference is to be had to Figs. 1, 2, 4, 5 and 7 in connection with the nut cracking means, previously described, generally, as 6, and more particularly to Figs. 4 and 5.

The nut cracking means, for the most part, is carried by a base 52, which is suitably secured to the table 1 and is arranged in general crosswise relationship to the travel of the conveyor 5. The mountings for the anvil 26, the plunger 27, the allied mechanisms, and the operating means, are all carried by the base 52 so that proper alinement is insured.

The anvil 26 is adjustably carried by a standard or upright 53, being provided with screw threads 54, engaged with corresponding threads in the standard, enabling the anvil to be adjusted toward the plunger 27. A squared part 55 is provided for the accommodation of a wrench for that purpose. The anvil 26 has a coned end 56, a hollow interior 57, and an opening 58 connecting the cone 56 with the interior 57. The cone 56, as also a cone 59 in the end of the plunger 27, are each of special form. Heretofore, so far as I am aware, the hollowed ends of nut cracking plungers or a plunger and its anvil, have freely permitted the insertion of the ends of the nut, for instance, a pecan, without reinforcing or supporting the coned or rounded ends of the nut. Consequently, in these earlier machines, the endwise pressure applied to the nut is taken for the most part on the extreme apices of the nut and as a result, the cracking operation mashes or deforms the ends of the nut, damaging the meat and making it impossible to so crack the shell that the meat comes out whole. The reason for this has been that, particularly with pecans, which have very sharp ends, only the extreme ends of the nut receive the pressure. To a lesser extent, but with almost the same effect, pecans having rounded ends, have been cracked at their ends instead of around their belts.

The cones 56 and 59 are of such a shape that they engage the rounded end parts of the nut and reinforce them so that instead of the rounded parts being cracked, only the belt or middle part of the shell is cracked, with my machine. The passageway 58 in the anvil 26 and a passageway or bore 60 in the plunger 27, receive the pointed ends of the nuts and enable the cones 56, 59 to engage and reinforce the rounded ends of the nuts. Consequently, when the nut cracking operation occurs, instead of the pressure being solely applied to the tips or extreme ends of the nut, it is more or less evenly applied to the end parts of the nut which are then not cracked but the pressure causes the belt or middle part of the nut to become cracked. Resulting from this cracking operation, due to the shape of the cones 56, 59 and the provision of the bores 58, 60, the meats of pecans cracked with my machine are not damaged or crushed and they remain intact.

The opening 58 and the bore 60 permit the ends 61, 62 of the respective ejectors 63, 64 to release the cracked nut, as shown in Fig. 4 and to carry out of the cones 56, 59, any remains of the shell or particles carried thereby which would otherwise clog the cones and interfere with proper cracking of nuts subsequently treated.

It will be understood that the plunger 27 is slidably mounted in standards or bearings 65, 66 and that the enlarged rear part 67 of the ejector 64 is slidably mounted in a standard or bearing 68, all of said bearings, including the standard 53, being secured to the base 52.

The right hand part of the plunger 27 is cylindrical but the left hand part thereof is square, in cross section. The part 62 of the ejector is cylindrical where it travels in the bore 60 and so is the part 64 which is slidable in the square part of the plunger. The part 67 of the ejector is square in cross section where it slides through the extension 68. The square parts 67 of the ejector and of the plunger fit any correspondingly-shaped openings in the standard 66 and 68 so that the parts are kept in alinement during their movements.

The ejector 63 is cylindrical and fits in the bore 57 and the part 61 is cylindrical and fits the cylindrical hole 58.

The ejector 64 has only a slight travel, and it is the longer travel of the plunger 27 which enables the plunger to be sufficiently retracted to cause the ejector 62 to project into the cone 59, as shown in Fig. 4, after the nut has been cracked. The travel of the ejector 63 is the same as that of the plunger 27, when the clearing operation and cracking of the nut, is brought about.

The actual advance of the plunger 27 to effect cracking is very slight, being from $\frac{1}{8}$ to $\frac{3}{16}$ of an inch while exerting pressure on the nut against the stationary anvil 26.

A standard 69, which is bolted to the base 52, serves as a guide for a pressure head 70, which is square in cross section and slides in a correspondingly-shaped opening 71 in said standard. The pressure head 70 is adjustably connected to the square part 67 by a right and left hand screw threaded adjusting screw 72, by which the pressure head 70 may be properly positioned to be engaged by a bowl or roller 73, carried by a cam 74, which cam is secured to shaft 11. The turning of shaft 11 once during each of its revolutions, causes the bowl 73 to press the head 70 to exert a cracking pressure on the nut through means presently to be described. When the bowl 73 disengages from the head 70, a spring 75, which surrounds the part 67 and is engaged with the standard 68 and with an end part 76 on the part 67, retracts the parts to the position shown in Fig. 4 which figure however, shows the cam 74 still further turned for the purpose of effecting retraction of the cracking plunger 27 for the purpose of projecting the ejectors, the nut having then been cracked and it being required that the nut be released from the plunger 27 and anvil 26 and any bits of shell discharged from the coned mouths 56, 59.

For the purpose of enabling the cracking plunger 27 to be retracted, and the ejectors 61, 62 to be projected, there is provided a bell crank lever 77 which is rockably mounted on a standard 69 at 78 and carries a bowl or roller 79 adapted to be engaged by the cam 74 after the bowl 73 has passed off of the head 70.

The rod 80 is pivoted to the bell crank lever 77 at 81 and adjustably connected to the ejector 61 at 82.

Another rod 83 is connected to the pivot 81 and is also pivoted to the side of the cracking plunger 27 at 84. An adjustable joint 85 is provided in the rod 83 so that its length may be increased or shortened for the purpose of regulating the extent of movement of the cracking plunger 27.

Being connected to the same bell crank lever 77, the retraction of the plunger 27 corresponds to the advance of the ejector 63 and as the plunger 27 is retracted by the action of the cam 74, the ejector 62 is projected. This operation is seen in Fig. 4. A contractile spring 86 connects the bell crank lever 77 to the standard 66 and causes the roller 79 to follow the contour of the cam 74, which cam has the necessary shape to effect the operations described.

Pivotally connected to the square part 67 at 87 is a yoke or rocker 88 which is adapted to slightly rock in relation to the part 67. To each end of the rocker 88 and at equal distances from the rocking center 87, are pivoted pairs of pawls 89, 89', shown in detail in Fig. 9 and also appearing in Figs. 4 and 5. The pivots for these pairs of pawls are shown at 90. The pawls 89, 89' are independent of each other and are of different lengths. Each pawl is independently turned by a spring 91 and each pawl has tails 92 which are positioned to be adapted to engage the standard 68 on the retraction of the ejector 64 and part 67 by the action of the spring 75 when the roller 73 is disengaged from the pressure head 70.

The cracking plunger 27 is provided with teeth 93 on its upper and lower faces, which teeth are adapted to be engaged by the pawls 89, 89'.

In practice, I have found that if it is desired to cause the cracking plunger 27 to have an extreme advance of, say, one sixteenth of an inch to effect cracking of the nut, then the interdental space or distance from the tip of one tooth 93 to an adjacent tooth will be one eighth of an inch and the pawl 89 of each pair will be one sixteenth of an inch longer than the pawl 89' of said pair. Inasmuch as the yoke 88 is pivoted intermediate the pivots 90 for the pawls, this mounting halves the distance a pawl will have to travel to become effective, hence each pawl need move but one thirty-second of an inch in order to become effective to couple the yoke 88 to the plunger 27 for the purpose of advancing the plunger to effect cracking of a nut. It will be understood that unless the pressure applied by the plunger 27 is exerted through the correct distance, improper cracking of the nut will result. The pawls 89, 89' insure the correct travel of the plunger, due to the difference in their lengths and the fact that they are carried on opposite sides of the pivot 87.

On the completion of the cracking operation caused by the engagement of the roller 73 with the head 70, the roller passes off of said head 70 and the spring 75 then retracts the plunger, whereupon the tails 92 of the pawls contact with the standard 68, as shown in Fig. 4, and the pawls are thus disengaged from the teeth 93. The cam 74 then engaging the roller 79, the plunger 27 is retracted, which action can occur because the release of the parts 64, 67 have freed the pawls 89, 89' from the teeth 93, due to the action of the spring 75, this action causes the ejectors 61, 62 to project, as shown in Fig. 4, to clear the nut from the anvil and plunger, whereupon continued rotation of the wrist wheel 21 causes the pawl 23 to engage a tooth of the ratchet wheel 25. The nut conveyor is then advanced to bring another nut in line with the plunger 27 and anvil 26 for a repetition of the operations previously described.

It will be understood that on further rotation of the shaft 11, the roller 79 is released, whereupon the spring 86, operating on the bell crank lever 77, advances the plunger to engage the nut which has just been presented for cracking. The advance of the plunger 27 causes the teeth 93 to be presented to the pawls 89, 89' so that when the roller 73 again strikes the head 70, the shifting of the head 70, and the yoke 88, frees the pawls 89, 89' from the standard 68 and enables them to positively engage the teeth 93 so that the plunger is again pushed a distance of, say, from ⅛ to 3/16 of an inch to effect cracking.

What I claim is:

1. In a nut cracking machine, the combination with a nut-cracking plunger having teeth, of a pawl-carrier, a pawl mounted on said carrier in position to engage said teeth, cam means for disengaging the pawl from said teeth to enable the plunger to be retracted, cam means for shifting the pawl carrier to cause the pawl to advance the plunger to effect cracking of the nut, pitman means for retracting the plunger, and an ejector carried with the pawl carrier and which is adapted to be operated when the plunger is retracted by the aforesaid means.

2. In a nut cracking machine, the combination with a nut-cracking plunger having two sets of teeth, of a rockable pawl carrier which is pivoted intermediate its ends, pairs of pawls of different lengths mounted on said carrier on opposite sides of the pivot thereof, the pawls of the respective pairs being in positions to engage the respective sets of teeth, cam means for shifting the pawl carrier to cause the pawls to advance the plunger to effect cracking of the nut, cam means for disengaging the pawls from said teeth to enable the plunger to be retracted, and means for retracting the plunger.

3. In a nut cracking machine, the combination with a nut-cracking plunger having two sets of teeth, of a rockable pawl carrier which is pivoted intermediate its ends, pairs of pawls of different lengths mounted on said carrier on opposite sides of the pivot thereof, the pawls of the respective pairs being in positions to engage the respective sets of teeth, cam means for shifting the pawl carrier to cause the pawls to advance the plunger to effect cracking of the nut, cam means for disengaging the pawls from said teeth to enable the plunger to be retracted, means for retracting the plunger, and an ejector carried with the pawl carrier and which is adapted to be operated when the plunger is retracted by the aforesaid means.

4. In a nut cracking machine, the combination with a stationary nut cracking anvil, of a movable nut-cracking plunger having two sets of teeth, a shiftable ejector movable in the plunger, a spring for retracting said ejector, a rockable pawl carrier which is pivoted to the ejector, pairs of pawls of different lengths mounted on said carrier on opposite sides of the pivot thereof, the pawls of the respective pairs being adapted to engage the respective sets of teeth, an ejector operating in the stationary anvil, a bell crank lever, rods connecting the bell crank lever to the plunger and to the last-named ejector, a spring acting on said bell crank lever, said spring being adapted to shift the plunger and the last-named ejector, means for releasing the pawls from the teeth of the plunger when the spring retracts the first-named ejector, and means common to the bell crank lever and to the ejector adapted for advancing the plunger when the pawls are engaged with the teeth and thereafter for operating the bell crank lever to retract the plunger and to render the ejectors operative.

5. In a nut cracking machine, the combination of an anvil, a movable plunger, an ejector operatively mounted in the plunger, a head connected with the ejector, means for operating the ejector, a yoke carried by the head, the plunger having ratchet teeth on different sides thereof, and pawls carried by the yoke in position to engage the ratchet teeth for lost-motion connection between the plunger and ejector, and means for operating the plunger independently of the ejector.

DELBERT LA FERNEY.